(12) United States Patent
Haeusser et al.

(10) Patent No.: US 11,443,170 B2
(45) Date of Patent: Sep. 13, 2022

(54) SEMI-SUPERVISED TRAINING OF NEURAL NETWORKS

(71) Applicant: GOOGLE LLC, Mountain View, CA (US)

(72) Inventors: Philip Haeusser, Munich (DE); Alexander Mordvintsev, Zurich (CH)

(73) Assignee: Google LLC, Mountain View, CA (US)

(*) Notice: Subject to any disclaimer, the term of this patent is extended or adjusted under 35 U.S.C. 154(b) by 791 days.

(21) Appl. No.: 16/461,287

(22) PCT Filed: Nov. 15, 2017

(86) PCT No.: PCT/US2017/061839
§ 371 (c)(1),
(2) Date: May 15, 2019

(87) PCT Pub. No.: WO2018/093926
PCT Pub. Date: May 24, 2018

(65) Prior Publication Data
US 2020/0057936 A1 Feb. 20, 2020

Related U.S. Application Data

(60) Provisional application No. 62/422,550, filed on Nov. 15, 2016.

(51) Int. Cl.
*G06N 3/04* (2006.01)
*G06F 17/16* (2006.01)
(Continued)

(52) U.S. Cl.
CPC .......... *G06N 3/0472* (2013.01); *G06F 17/16* (2013.01); *G06F 17/18* (2013.01); *G06K 9/6256* (2013.01); *G06K 9/6267* (2013.01); *G06N 3/08* (2013.01)

(58) Field of Classification Search
CPC ........ G06N 3/0472; G06N 3/08; G06N 3/084; G06N 3/0454; G06F 17/16; G06F 17/18; G06K 9/6256; G06K 9/6267
See application file for complete search history.

(56) References Cited

U.S. PATENT DOCUMENTS 8,527,432 B1 * 9/2013 Guo .................. G06N 20/10
706/14
9,275,347 B1 * 3/2016 Harada ................ G06N 3/08
(Continued)

OTHER PUBLICATIONS

Zhou, X., et al., "Semi-supervised learning", in Academic Press Library in Signal Processing, Chapter 22, pp. 1239-1269 (2014).*
(Continued)

*Primary Examiner* — Xuemei G Chen
(74) *Attorney, Agent, or Firm* — Fish & Richardson P.C.

(57) ABSTRACT

Methods, systems, and apparatus, including computer programs encoded on computer storage media, for training a neural network. One of the methods includes obtaining a batch of labeled training items and a batch of unlabeled training items; processing the labeled training items and the unlabeled training items using the neural network and in accordance with current values of the network parameters to generate respective embeddings; determining a plurality of similarity values, each similarity value measuring a similarity between the embedding for a respective labeled training item and the embedding for a respective unlabeled training item; determining a respective roundtrip path probability for each of a plurality of roundtrip paths; and performing an iteration of a neural network training procedure to determine a first value update to the current values of the network parameters that decreases roundtrip path probabilities for incorrect roundtrip paths.

20 Claims, 4 Drawing Sheets

(51) Int. Cl.
    G06F 17/18    (2006.01)
    G06K 9/62     (2022.01)
    G06N 3/08     (2006.01)

(56) References Cited

U.S. PATENT DOCUMENTS

| | | | |
|---|---|---|---|
| 10,552,735 B1* | 2/2020 | Widerhorn | G06N 20/10 |
| 2009/0204558 A1 | 8/2009 | Weston et al. | |
| 2014/0297252 A1* | 10/2014 | Prasad | G10L 15/01 |
| | | | 704/2 |
| 2016/0078339 A1* | 3/2016 | Li | G06N 3/084 |
| | | | 706/20 |
| 2016/0371431 A1* | 12/2016 | Haque | G16B 30/10 |
| 2017/0061625 A1* | 3/2017 | Estrada | G06T 7/90 |
| 2017/0316099 A1* | 11/2017 | Xu | G06Q 50/01 |
| 2018/0069893 A1* | 3/2018 | Amit | G06F 21/554 |
| 2019/0205733 A1* | 7/2019 | Ghaeini | G06K 9/6267 |

OTHER PUBLICATIONS

Abadi et al., "TensorFlow: Large-Scale Machine Learning on Heterogeneous Distributed Systems," https://arxiv.org/abs/1603.04467, Mar. 2016, 19 pages.
Bousmalis et al., "Domain Separation Networks," https://arxiv.org/abs/1608.06019, Aug. 2016, 15 pages.
Clevert et al., "Fast and Accurate Deep Network Learning by Exponential Linear Units (ELUs)," https://arxiv.org/abs/1511.07289v1, Nov. 2015, 14 pages.
Coates et al., "An Analysis of Single-Layer Networks Unsupervised Feature Learning," retrieved from URL <http://robotics.stanford.edu/~ang/papers/nipsdlufl10-AnalysisSingleLayerUnsupervisedFeatureLearning.pdf>, 2010, 9 pages.
Collobert et al., "Natural Language Processing (Almost) from Scratch," Journal of Machine Learning Research, Aug. 2011, 2493-2537.
Doersch et al., "Unsupervised Visual Representation Learning by Context Prediction," 2015 IEEE International Conference on Computer Vision (ICCV), Dec. 2015, 1422-1430.
Dosovitskiy et al., "Discriminative Unsupervised Feature Learning with Convolutional Neural Networks," Advances in Neural Information Processing Systems27 (2014), Dec. 2014, 9 pages.
Ganin et al., "Domain-Adversarial Training of Neural Networks," The Journal of Machine Learning Research, Jan. 2016, 17:1-35.
Goodfellow et al., "Generative Adversarial Nets," Advances in Neural Information Processing Systems 27 (2014), 2014, 9 pages.
Haeusser et al., "Learning by Association—A versatile semi-supervised training method for neural networks," https://arxiv.org/abs/1706.00909, Jun. 2017, 10 pages.
He et al., "Deep Residual Learning for Image Recognition," https://arxiv.org/abs/1512.03385, Dec. 2015, 12 pages.
Higgins et al., "Early Visual Concept Learning with Unsupervised Deep Learning," ahttps://arxiv.org/abs/1606.05579v1, Jun. 2016, 12 pages.
Hinton, "A Practical Guide to Training Restricted Boltzmann Machines," Momentum, retrieved from URL <https://www.csrc.ac.cn/upload/file/20170703/1499052743888438.pdf>, Aug. 2010, 21 pages.
Huang et al., "Unsupervised Learning of Discriminative Attributes and Visual Representations," 2016 IEEE Conference on Computer Vision and Pattern Recognition (CVPR), Jun. 2016, 5175-5184.
Joachims, "Transductive Inference for Text Classification using Support Vector Machines," Proceedings of the Sixteenth International Conference on Machine Learning, retrieved from URL <http://www1.cs.columbia.edu/~dplewis/candidacy/joachims99transductive.pdf>, Jun. 1999, 10 pages.
Kim, "Convolutional Neural Networks for Sentence Classification," https://arxiv.org/abs/1408.5882v1, Aug. 2014, 6 pages.
Kingma et al., "Adam: A Method for Stochastic Optimization," https://arxiv.org/abs/1412.6980v1, Dec. 2014, 9 pages.
Kingma et al., "Semi-supervised Learning with Deep Generative Models," Advances in Neural Information Processing Systems 27 (NIPS 2014), Dec. 2014, 9 pages.
Krizhevsky et al., "ImageNet Classification with Deep Convolutional Neural Networks," Advances in Neural Information Processing Systems 25 (NIPS 2012), 2012, 9 pages.
Le, "Building high-level features using large scale unsupervised learning," 2013 IEEE International Conference on Acoustics, Speech and Signal Processing, May 2013, 8595-8598.
LeCun et al., "Gradient-Based Learning Applied to Document Recognition," Proceedings of the IEEE, Nov. 1998, 86(11):2278-2324.
Lee, "Pseudo-Label: The Simple and Efficient Semi-Supervised Learning Method for Deep Neural Networks," Workshop on Challenges in Representation Learning, ICML, Jun. 2013, 6 pages.
Maaløe et al., "Auxiliary Deep Generative Models," https://arxiv.org/abs/1602.05473v1, Feb. 2016, 9 pages.
Miyato et al., "Distributional Smoothing by Virtual Adversarial Examples," https://arxiv.org/abs/1507.00677v1, Jul. 2015, 14 pages.
Netzer et al., "Reading Digits in Natural Images with Unsupervised Feature Learning," retrieved from URL <http://ai.stanford.edu/~twangcat/papers/nips2011_housenumbers.pdf>, 2011, 9 pages.
PCT International Preliminary Report on Patentability in International Appln. No. PCT/US2017/061839, dated Feb. 20, 2019, 25 pages.
PCT International Search Report and Written Opinion in International Appln. No. PCT/US2017/061839, dated Mar. 6, 2018, 19 pages.
PCT Written Opinion in International Appln. No. PCT/US2017/061839, dated Oct. 25, 2018, 10 pages.
Radford et al., "Unsupervised Representation Learning with Deep Convolutional Generative Adversarial Networks," https://arxiv.org/abs/1511.06434v1, Nov. 2015, 15 pages.
Ranzato et al., "Semi-supervised Learning of Compact Document Representations with Deep Networks," Proceedings of the 25th International Conference on Machine Learning, Jul. 2008, 792-799.
Rasmus et al., "Semi-supervised Learning with Ladder Networks," Advances in Neural Information Processing Systems 28 (NIPS 2015), Dec. 2015, 3546-3554.
Saenko et al., "Adapting Visual Category Models to New Domains," European Conference on Computer Vision, Sep. 2010, 213-226.
Sajjadi et al., "Mutual Exclusivity Loss for Semi-Supervised Deep Learning," 2016 IEEE International Conference on Image Processing (ICIP), Sep. 2016, 1908-1912.
Sajjadi et al., "Regularization With Stochastic Transformations and Perturbations for Deep Semi-Supervised Learning," ahttps://arxiv.org/abs/1606.04586, Jun. 2016, 9 pages.
Salimans et al., "Improved Techniques for Training GANs," https://arxiv.org/abs/1606.03498, Jun. 2016, 10 pages.
Smolensky, "Information Processing in Dynamical Systems: Foundations of Harmony Theory," Technical report, DTIC Document, retrieved from URL <https://web.stanford.edu/~jlmcc/papers/PDP/Volume%201/Chap6_PDP86.pdf>, Feb. 1986, 88 pages.
Srivastava et al., "Unsupervised Learning of Video Representations using LSTMs," https://arxiv.org/abs/1502.04681v1, Feb. 2015, 12 pages.
Szegedy et al., "Going Deeper with Convolutions," 2015 IEEE Conference on Computer Vision and Pattern Recognition (CVPR), Jun. 2015, 1-9.
Venugopalan et al., "Translating Videos to Natural Language Using Deep Recurrent Neural Networks," https://arxiv.org/abs/1412.4729v1, Dec. 2014, 10 pages.
Weston et al., "Deep Learning via Semi-supervised Embedding," Neural Networks: Tricks of the Trade, 2012, 639-655.
Yang et al., "Multi-Task Cross-Lingual Sequence Tagging from Scratch," https://arxiv.org/abs/1603.06270v1, Mar. 2016, 10 pages.
Zhao et al., "Stacked What-Where Auto-encoders," https://arxiv.org/abs/1506.02351v1, Jun. 2015, 9 pages.

* cited by examiner

SEMI-SUPERVISED TRAINING OF NEURAL NETWORKS

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a neural network that has network parameters and that is configured to receive an input data item and to process the input data item to generate an embedding of the input data item in accordance with the network parameters. In particular, the system trains the neural network in a semi-supervised manner, i.e., using both labeled training items and unlabeled training items.

In some aspects, a method, and corresponding system, includes obtaining a labeled batch of labeled training items, with each labeled training item in the labeled batch being associated with a respective label that identifies a category to which the labeled training item belongs; processing the labeled training items in the labeled batch using the neural network and in accordance with current values of the network parameters to generate respective embeddings for each of the labeled training items; obtaining an unlabeled batch of unlabeled training items; processing the unlabeled training items in the unlabeled batch using the neural network and in accordance with the current values of the network parameters to generate respective embeddings for each of the unlabeled training items; determining a plurality of similarity values, each similarity value measuring a similarity between the embedding for a respective labeled training item and the embedding for a respective unlabeled training item; determining, from the similarity values, a respective roundtrip path probability for each of a plurality of roundtrip paths, each roundtrip path starting from the embedding for a respective starting labeled training item, going to the embedding for a respective unlabeled training item, and returning to the embedding for a respective ending labeled training item; and performing an iteration of a neural network training procedure to determine a first value update to the current values of the network parameters that decreases roundtrip path probabilities for incorrect roundtrip paths, with an incorrect roundtrip path being a roundtrip path for which the starting labeled training item and the ending labeled training item have different labels.

Optionally, the method then includes providing data specifying the trained neural network for use in generating embeddings of new input data items.

In some implementations in order to decrease roundtrip path probabilities the training may employ a loss term, later referred to as a walker loss term, which depends on a difference between a target distribution and a sum of one or more roundtrip probabilities. The target distribution may be chosen to discourage the incorrect roundtrip paths relative with correct roundtrip paths, which start and end at labelled training items having the same label, for example by assigning these a lower probability than correct paths in the target distribution, e.g., by assigning incorrect paths zero probability. One suitable loss term for the first value update is a cross-entropy loss term between the target distribution and the sum of roundtrip probabilities. The training may comprise a gradient ascent or descent-based procedure including the loss term with the aim of minimizing this term.

In some implementations determining the round trip probability of a path may comprise determining a forward path probability from the embedding for a starting labeled training item to the embedding for an unlabeled training item and determining a backward path probability from the embedding for the unlabeled training item to the embedding for the ending labeled training item for the roundtrip path. A path probability may be determined based on a determined similarity between the two embeddings, for example calculated from a dot product between the embeddings or using a measure of distance between the embeddings.

The training may include a second, visit loss term to encourage the method to include, or visit, embeddings for unlabeled training inputs. This aims to encourage the method to generalize better by using more of the unlabeled training inputs. The visit loss term may increase uniformity across visit probabilities for embeddings of unlabeled training inputs, where a visit probability for an embedding given unlabeled training input is a sum of forward path probabilities for forward paths that go to the embedding for the unlabeled training input. Thus the visit loss term may aim to minimize a difference between the visit probabilities and a uniform probability distribution. One suitable loss term is a cross-entropy loss term. The training procedure may thus determine a second value update to the current values of the network parameters. By combining the walker and visit loss terms the first and second value updates may be performed at the same time.

Optionally the first (walker) and second (visit) loss terms may have unequal weights in a combined loss term. For example where the method is being employed for domain adaption, where the labels in the data sets or domains are the same but the distributions of the labels may be different, the visit loss term may be given a lower weight than the walker term. An example of domain adaption is using labels from one domain, such as handwritten digits, in another such as street view house numbers.

The creation of embeddings is useful in itself, for example to provide a front end for a machine learning system performing any of a wide range of tasks as described later. However the neural network may further be configured to process the embedding of the data item to generate a classification output for the data item that includes a respective score for each of a plurality of categories. Thus a further classification loss term may be included when performing the training procedure, for example with the aim of minimizing a further cross-entropy loss between a label for a training item and its classification output. The classification may be trained concurrently with the embeddings or there may be some pre-training using the classification loss.

Particular embodiments of the subject matter described in this specification can be implemented so as to realize one or more of the following advantages. By training a neural network as described in this specification, the trained neural network can generate embeddings that accurately reflect the similarity between input data items and that can effectively be used to classify the input data items, i.e., by processing the generated embeddings through one or more additional neural network layers. In particular, by training the neural network as described in this specification, unlabeled training data can be effectively incorporated into the training, improving the performance of the trained neural network. That is, the performance of the trained neural network can be improved without requiring additional labeled training data. Because unlabeled training data is generally more readily available than labeled training data, the effectiveness of the training can be improved without greatly increasing the time and computational cost of obtaining or generating additional training data. Additionally, the neural network can be effectively trained even if only a relatively small amount of labeled training data is available by effectively incorporating readily available unlabeled training data into the training as described in this specification. Thus, the training of the neural network to generate accurate embeddings becomes less dependent on the availability of accurately labeled training data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
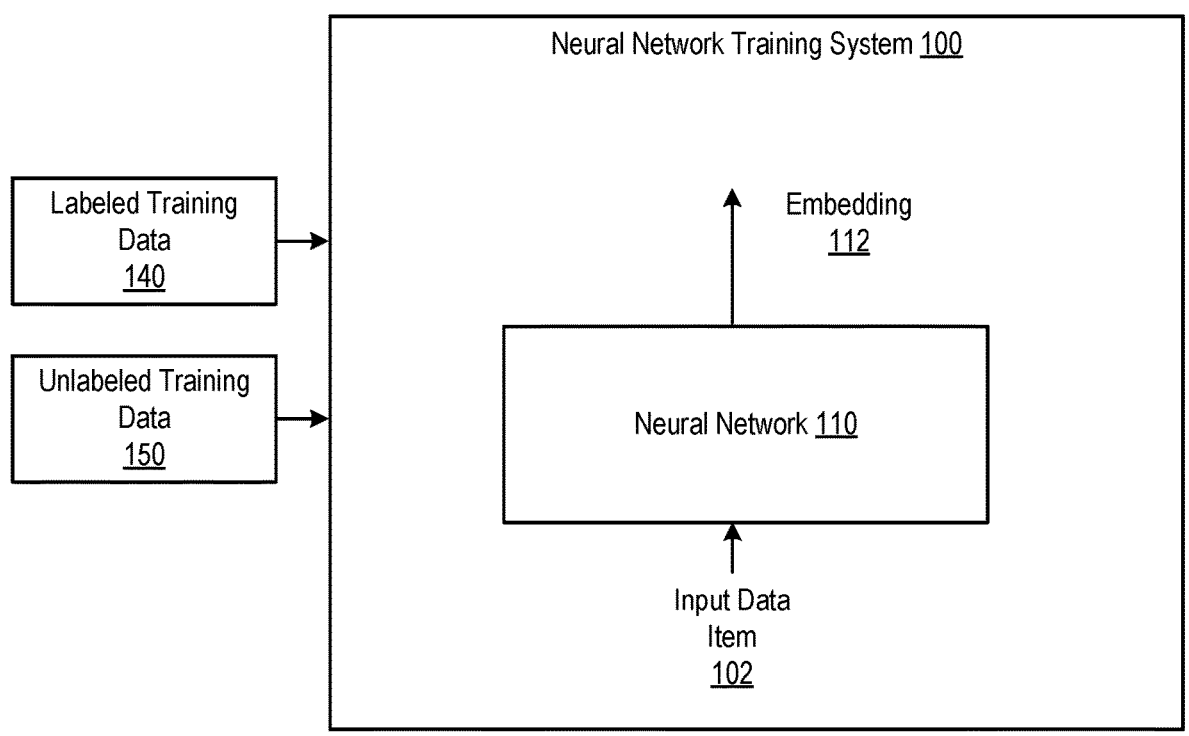
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 is a system that trains a neural network 110 on labeled training data 140 and unlabeled training data 150 to determine trained values of the parameters of the neural network 110, referred to in this specification as network parameters, from initial values of the network parameters.

The neural network 110 is a neural network that is configured to receive an input data item 102 and to process the input data item to generate an embedding 112 of the input data item 102 in accordance with the network parameters. Generally, an embedding of a data item is an ordered collection of numeric values, e.g., a vector, that represents the data item. In other words, each embedding is a point in a multi-dimensional embedding space. Once trained, the positions of embeddings in the multi-dimensional space can reflect similarities between the data items that the embeddings represent.

The neural network 110 can be configured to receive as input any kind of digital data input and to generate an embedding from the input. For example, the input data items can be any of images, portions of documents, text sequences, audio data, and so on.

In some cases, the neural network 110 can also be configured to generate a classification output for an input data item by processing the embedding for the data item through one or more additional neural network layers, e.g., through one or more fully-connected layers and an output layer.

For example, if the inputs to the neural network 100 are images, the classification output generated by the neural network 110 for a given image may be scores for each of a set of object categories, with each score representing an estimated likelihood that the image contains an image of an object belonging to the category.

As another example, if the inputs to the neural network 110 are text from Internet resources (e.g., web pages) or documents, the classification output generated by the neural network 110 for a given Internet resource, document, or portion of a document may be a score for each of a set of topics, with each score representing an estimated likelihood that the Internet resource, document, or document portion is about the topic.

The neural network 110 can have any architecture that is appropriate for the type of network inputs processed by the neural network 110. For example, when the network inputs are images, the neural network 110 can be a convolutional neural network.

Once trained, the embeddings generated by the neural network 110 can be used for any of a variety of purposes, i.e., in addition to or instead of being used to generate a classification output.

For example, the system 100 can provide embeddings generated by the trained neural network as input to another system as features of the corresponding network inputs, e.g., for use in performing a machine learning task on the network inputs. Example tasks may include feature based retrieval, clustering, near duplicate detection, verification, feature matching, domain adaptation, video based weakly supervised learning, and so on. As further examples, the system may also be used for object or action recognition/detection, image segmentation, visual concept extraction from still or moving images, control tasks, identifying characteristics or properties of chemicals such as drugs, and machine translation.

The labeled training data 140 that is used by the system 100 to train the neural network 110 includes multiple batches of labeled training items. The training items are referred to as "labeled" training items because the labeled training data 140 also includes, for each labeled training item, a label that identifies the category, e.g., the object class or the topic, to which the labeled training item belongs.

The unlabeled training data 150 that is used by the system 100 to train the neural network 110 includes multiple batches of unlabeled training items. The training items are referred to as "unlabeled" training items because the system 100 does not have access to any labels for any of the unlabeled training items.

The system 100 trains the neural network 110 by performing multiple iterations of a neural network training procedure, with each iteration of the procedure being performed on both a batch of labeled training items and a batch of unlabeled training items. During each iteration, the system 100 determines an update to current values of the network parameters as of the iteration and applies the update to the current values to generate updated values of the network parameters.

Training the neural network using labeled and unlabeled training items is described in more detail below with reference to FIGS. 2-4.

Once the neural network has been trained, the system 100 provides data specifying the trained neural network for use in processing new network inputs. That is, the system 100 can output, e.g., by outputting to a user device or by storing in a memory accessible to the system 100, the trained values of the network parameters for later use in processing inputs using the trained neural network. Alternatively or in addition to outputting the trained neural network data, the system 100 can instantiate an instance of the neural network having the trained values of the network parameters, receive inputs to be processed, e.g., through an application programming interface (API) offered by the system, use the trained neural network to process the received inputs to generate embeddings, classification outputs, or both, and then provide the generated embeddings, classification outputs, or both in response to the received inputs.

Figure 2:
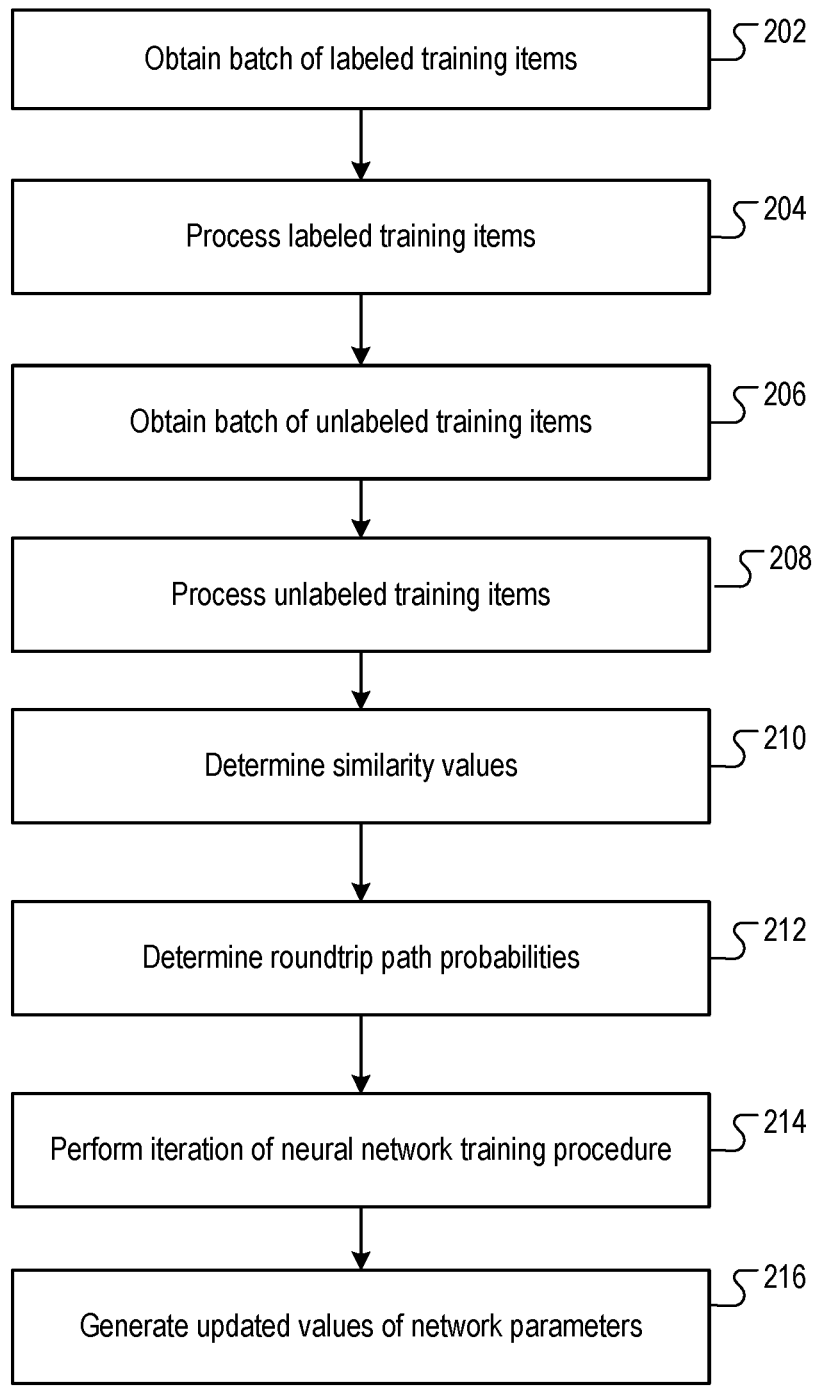
FIG. 2 is a flow diagram of an example process for training a neural network.

FIG. 2 is a flow diagram of an example process 200 for training a neural network on a batch of unlabeled training items and a batch of labeled training items. For convenience, the process 200 will be described as being performed by a system of one or more computers located in one or more locations. For example, a neural network training system, e.g., the neural network training system 100 of FIG. 1, appropriately programmed, can perform the process 200.

The system can perform the process 200 multiple times for multiple different labeled batch—unlabeled batch combinations to determine trained values of the network parameters from initial values of the network parameters. For example, the system can continue performing the process 200 for a specified number of iterations, for a specified amount of time, or until the change in the values of the parameters falls below a threshold.

The system obtains a batch of labeled training items (step 202).

The system processes each labeled training item in the batch using the neural network and in accordance with current values of the network parameters to generate a respective embedding for each of the labeled training items (step 204).

The system obtains an unlabeled batch of unlabeled training items (step 206).

The system processes each unlabeled training item in the batch using the neural network and in accordance with current values of the network parameters to generate a respective embedding for each of the unlabeled training items (step 208).

For each possible combination of labeled training item and unlabeled training item, the system determines a similarity value between the embedding of the labeled training item in the combination and the embedding of the unlabeled training item in the combination (step 210). Each similarity value measures the similarity between one embedding and another. For example, the similarity can be a dot product similarity between the two embeddings, the Euclidean distance between the two embeddings, or another appropriate similarity metric.

The system determines, from the similarity values, a respective roundtrip path probability for each of multiple roundtrip paths (step 212). Each roundtrip path starts from the embedding for a respective starting labeled training item, goes to the embedding for a respective unlabeled training item, and returns to the embedding for a respective ending labeled training item.

Figure 3:
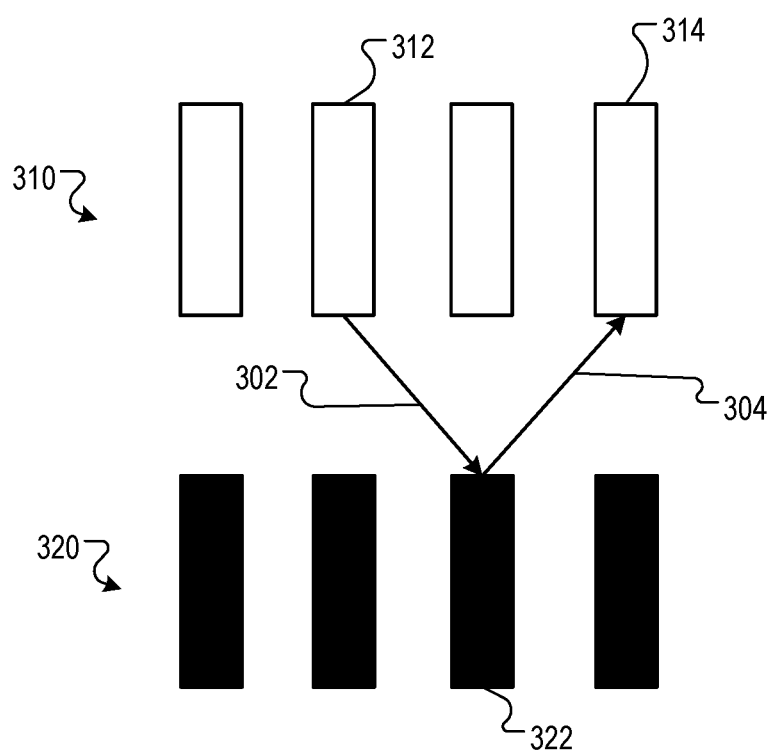
FIG. 3 shows an example roundtrip path between embeddings.

As an example, FIG. 3 illustrates an example roundtrip path that starts and ends at embeddings for labeled training items from an example set of embeddings for labeled training items 310. In particular, the roundtrip path illustrated in FIG. 3 starts at the embedding for a starting labeled training tem 312 and includes a forward path 302 from the embedding for the starting labeled training item 312 to the embedding of an unlabeled training item 322 from a set of embeddings for unlabeled training items 320. The roundtrip path then includes a backward path 304 from the embedding for the unlabeled training item 322 to the embedding for an ending labeled training item 314.

Determining the roundtrip path probability for a given roundtrip path is described below with reference to FIG. 4.

The system performs an iteration of a neural network training procedure to determine a first update to the current values of the network parameters that decreases the roundtrip path probabilities for incorrect roundtrip paths (step 214).

That is, the neural network training procedure is a conventional gradient-based procedure, e.g., stochastic gradient descent or Adam, and the system performs the iteration to minimize a loss function that includes a walker loss term that is dependent on the roundtrip path probabilities for incorrect roundtrip paths.

An incorrect roundtrip path is a roundtrip path for which the starting labeled training item and the ending labeled training item have different labels. That is, if the starting labeled training item and the ending labeled training item for a given roundtrip path have different labels, the system determines that the given roundtrip path is an incorrect roundtrip path. In the example of FIG. 3, if the starting labeled training tem 312 and the ending labeled training item 314 have different labels, then the roundtrip path illustrated in FIG. 3 would be an incorrect roundtrip path. If the starting labeled training tem 312 and the ending labeled training item 314 have the same label, then the roundtrip path illustrated in FIG. 3 would not be an incorrect roundtrip path.

In particular, in some implementations, the first (walker) loss term is a cross-entropy loss between (i) a target distribution over pairs of labeled training inputs that each include a respective first labeled training input and a respective second labeled training input and (ii) for each of the pairs of labeled training inputs, a sum of roundtrip probabilities for roundtrip paths that start at the first labeled training input of the pair and return to the second labeled training input of the pair. That is, for a pair that includes a labeled training input i and a labeled training input j, the sum satisfies:

$$\Sigma_k P_{ik}^{ab} P_{kj}^{ba},$$

where the sum is over all of the unlabeled training items, and where $P_{ik}^{ab} P_{kj}^{ba}$ is the roundtrip path probability for a roundtrip path that starts at the embedding for the labeled training input i, goes to the embedding for the unlabeled training input k, and returns to the embedding for the labeled training input j.

In order for the first loss term to discourage incorrect roundtrip paths, the target distribution assigns higher probabilities to pairs of training inputs that have same label than to pairs of training inputs that have different labels. In some implementations, the target distribution assigns a zero probability to pairs of labeled training inputs that include a first labeled training input and a second labeled training input that have different labels. In some of these implementations, the target distribution assigns, to each pair of labeled training inputs that includes a first labeled training input and a second labeled training input that have the same label, a probability that is equal to one divided by the total number of labeled training inputs in the batch that have the label that is shared by the first and second labeled training inputs. Thus, in these implementations, the first loss term penalizes incorrect roundtrip paths and encourages a uniform probability distribution of correct roundtrip paths, i.e., of paths that start and end at labeled training items having the same label.

The loss function may also include other loss terms, i.e., the system can also determine other updates to the current values of the network parameters as part of performing the iteration of the neural network training technique.

In particular, in some implementations, the loss function also includes a visit loss term that measures the uniformity of visit probabilities for embeddings of unlabeled training inputs. The visit probability for an embedding of a given unlabeled training input is a sum of forward path probabilities for forward paths that go to the embedding for the unlabeled training input. In the example of FIG. 3, the visit probability for the embedding of the unlabeled training item 322 would be a sum of the forward path probabilities of forward paths to the embedding of the unlabeled training item 322 from the embeddings for the set of labeled training items 310. Determining a forward path probability is described in more detail below with reference to FIG. 4.

By performing the iteration and minimizing the visit loss term, the system determines a second update to the current values of the network parameters that increases the uniformity across the visit probabilities for embeddings of unlabeled training inputs.

In some of these examples, the visit loss term is a cross-entropy loss between (i) a uniform target distribution across the unlabeled training inputs and (ii) the visit probabilities for the unlabeled training inputs. The uniform target distribution assigns the same probability to each unlabeled training input, i.e., each probability is equal to one divided by the total number of unlabeled training inputs.

As described above, in some implementations, the neural network also generates a classification output for each input data item. In these implementations, the loss function can also include a classification loss term that is a cross-entropy loss between, for each labeled training item, the label for the training item and the classification for the training item. Thus, by performing the iteration, the system minimizes this cross-entropy loss to determine a third value update to the current values of the network parameters that increases the accuracy of the classification outputs generated by the neural network.

As part of the iteration of the neural network training technique, the system determines the updates to the current values of the network parameters by determining a gradient of the loss function with respect to the network parameters, i.e., through backpropagation, and then determining the update to the current values of the parameters from the gradient. For example, when the training procedure is stochastic gradient descent, the system determines the updates by applying a learning rate to the gradient.

The system generates updated values of the network parameters by applying the first value update and any other value updates determined by performing the iteration to the current values of the parameters (step 216). In particular, the system adds the value updates to the current values of the network parameters to determine the updated values of the network parameters.

Figure 4:
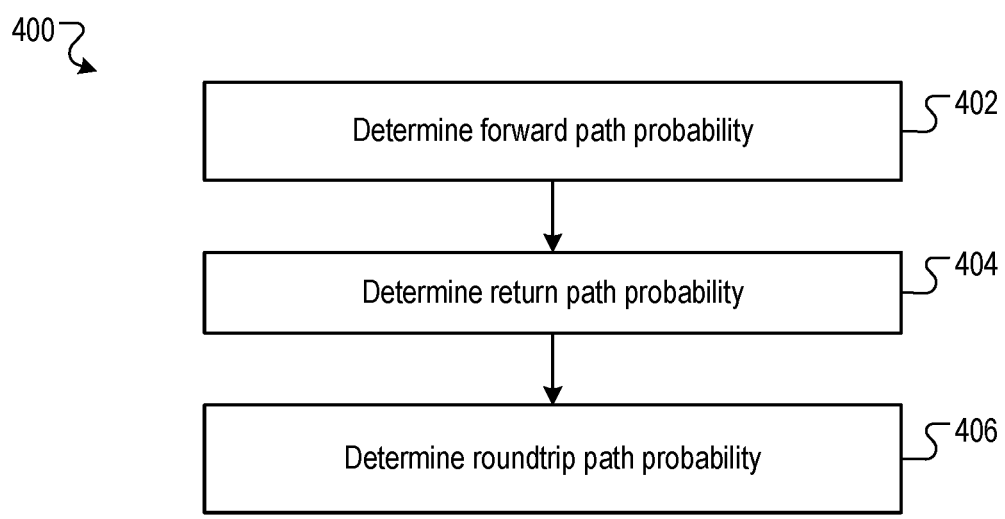
FIG. 4 is a flow diagram of an example process for determining a roundtrip path probability.

FIG. 4 is a flow diagram of an example process 400 for determining a roundtrip path probability for a roundtrip that starts at the embedding for a starting labeled training item, goes to the embedding for a particular unlabeled training item, and returns to the embedding for an ending labeled training item. For convenience, the process 400 will be described as being performed by a system of one or more computers located in one or more locations. For example, a neural network training system, e.g., the neural network training system 100 of FIG. 1, appropriately programmed, can perform the process 400.

The system determines a forward path probability for a forward path from the embedding for the starting labeled training item to the embedding for the particular unlabeled training item (step 402). Generally, the system determines the forward path probability based on the similarity value between the embedding for the starting labeled training item and the embedding for the particular unlabeled training item. In particular, the forward path probability $P_{ij}^{ab}$ from the embedding of the labeled training item i to the embedding of the unlabeled training item k satisfies:

$$P_{ik}^{ab} = \frac{e^{M_{ik}}}{\sum_{k'} e^{M_{ik'}}},$$

where $M_{ik}$ is the similarity between the embedding of the labeled training item i and the embedding of the unlabeled training item k, and the sum is a sum over all of the unlabeled training items.

The system determines a backward path probability for a backward path from the embedding for the particular unlabeled training item to the embedding for the ending labeled training item (step 404). Generally, the system determines the backward path probability based on the similarity value between the embedding for the particular unlabeled training item and the embedding for the ending labeled training item. In particular, the backward path probability $P_{kj}^{ba}$ from the embedding of the particular unlabeled training item k to the embedding of the labeled training item j satisfies:

$$P_{kj}^{ba} = \frac{e^{M_{kj}}}{\sum_{j'} e^{M_{kj'}}},$$

where $M_{kj}$ is the similarity between the embedding of the particular unlabeled training item k and the embedding of the labeled training item j, and the sum is a sum over all of the labeled training items.

The system determines the roundtrip path probability from the forward path probability and the backward path probability (step 406). In particular, the roundtrip path probability is the product of the forward path probability and the backward path probability. This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of training a neural network that has a plurality of network parameters and that is configured to receive an input data item comprising an image and to process the input data item to generate an embedding of the input data item in accordance with the network parameters, wherein the neural network is further configured to process the embedding of the data item to generate a classification output for the data item that includes a respective score for each of a plurality of categories, the method comprising:

obtaining a labeled batch of labeled training items, wherein each labeled training item in the labeled batch is associated with a respective label that identifies a category to which the labeled training item belongs;

processing the labeled training items in the labeled batch using the neural network and in accordance with current values of the network parameters to generate respective embeddings for each of the labeled training items;

obtaining an unlabeled batch of unlabeled training items;

processing the unlabeled training items in the unlabeled batch using the neural network and in accordance with the current values of the network parameters to generate respective embeddings for each of the unlabeled training items;

determining a plurality of similarity values, each similarity value measuring a similarity between the embedding for a respective labeled training item and the embedding for a respective unlabeled training item;

determining, from the similarity values, a respective roundtrip path probability for each of a plurality of roundtrip paths, wherein each roundtrip path starts from the embedding for a respective starting labeled training item, goes to the embedding for a respective unlabeled training item, and returns to the embedding for a respective ending labeled training item, wherein determining the respective roundtrip path probability for each of the plurality of roundtrip paths comprises:

determining a forward path probability for a forward path from the embedding for the starting labeled training item for the roundtrip path to the embedding for the unlabeled training item for the roundtrip path based on the similarity value between the embedding for the starting labeled training item for the roundtrip path to the embedding for the unlabeled training item for the roundtrip path;

determining a backward path probability for a backward path from the embedding for the unlabeled training item for the roundtrip path to the embedding for the ending labeled training item for the roundtrip path based on the similarity value between the embedding for the unlabeled training item for the roundtrip path and the embedding for the ending labeled training item for the roundtrip path; and determining the roundtrip path probability from the product of the forward path probability and the backward path probability; and performing an iteration of a neural network training procedure to determine a first value update to the current values of the network parameters that decreases roundtrip path probabilities for incorrect roundtrip paths, wherein an incorrect roundtrip path is a roundtrip path for which the starting labeled training item and the ending labeled training item have different labels.

2. The method of claim 1, further comprising:
   providing data specifying the trained neural network for use in generating embeddings of new input data items.

3. The method of claim 1, wherein performing the iteration of the neural network training procedure comprises:

performing the iteration to determine a second value update to the current values of the network parameters that increases uniformity across visit probabilities for embeddings of unlabeled training inputs, wherein a visit probability for an embedding given unlabeled training input is a sum of forward path probabilities for forward paths that go to the embedding for the unlabeled training input.

4. The method of claim 3, wherein performing the iteration to determine the second value update comprises:
performing the iteration to minimize a cross-entropy loss between (i) a uniform target distribution across the unlabeled training inputs and (ii) the visit probabilities for the unlabeled training inputs.

5. The method of claim 1, wherein performing the iteration to determine the first value update comprises:
performing the iteration to minimize a cross-entropy loss between (i) a target distribution over pairs of labeled training inputs that each include a respective first labeled training input and a respective second labeled training input and (ii) for each pair of labeled training inputs, a sum of roundtrip probabilities for roundtrip paths that start at the first labeled training input of the pair and return to the second labeled training input of the pair, wherein the target distribution assigns higher probabilities to pairs of training inputs that have the same label than to pairs of training inputs that have different labels.

6. The method of claim 5, wherein the target distribution assigns a zero probability to pairs of labeled training inputs that include a first labeled training input and a second labeled training input that have different labels.

7. The method of claim 5, wherein the target distribution assigns, to pairs of labeled training inputs that include a first labeled training input and a second labeled training input that have the same label, a probability that is equal to one divided by a total number of labeled training inputs that have the label.

8. The method of claim 1, wherein performing the iteration further comprises:
performing the iteration of the neural network training procedure to minimize a cross-entropy loss between, for each labeled training item, the label for the training item and the classification for the training item.

9. The method of claim 1, wherein the neural network training procedure is stochastic gradient descent.

10. The method of claim 1, wherein the similarity values are dot products.

11. The method of claim 1, wherein the similarity values are Euclidean distances.

12. A system comprising one or more computers and one or more storage devices storing instructions that when executed by the one or more computers cause the one or more computers to perform operations for training a neural network that has a plurality of network parameters and that is configured to receive an input data item comprising an image and to process the input data item to generate an embedding of the input data item in accordance with the network parameters, wherein the neural network is further configured to process the embedding of the data item to generate a classification output for the data item that includes a respective score for each of a plurality of categories, the operations comprising:
obtaining a labeled batch of labeled training items, wherein each labeled training item in the labeled batch is associated with a respective label that identifies a category to which the labeled training item belongs;
processing the labeled training items in the labeled batch using the neural network and in accordance with current values of the network parameters to generate respective embeddings for each of the labeled training items:
obtaining an unlabeled batch of unlabeled training items;
processing the unlabeled training items in the unlabeled batch using the neural network and in accordance with the current values of the network parameters to generate respective embeddings for each of the unlabeled training items;
determining a plurality of similarity values, each similarity value measuring a similarity between the embedding for a respective labeled training item and the embedding for a respective unlabeled training item;
determining, from the similarity values, a respective roundtrip path probability for each of a plurality of roundtrip paths, wherein each roundtrip path starts from the embedding for a respective starting labeled training item, goes to the embedding for a respective unlabeled training item, and returns to the embedding for a respective ending labeled training item, wherein determining the respective roundtrip path probability for each of the plurality of roundtrip paths comprises:
determining a forward path probability for a forward path from the embedding for the starting labeled training item for the roundtrip path to the embedding for the unlabeled training item for the roundtrip path based on the similarity value between the embedding for the starting labeled training item for the roundtrip path to the embedding for the unlabeled training item for the roundtrip path:
determining a backward path probability for a backward path from the embedding for the unlabeled training item for the roundtrip path to the embedding for the ending labeled training item for the roundtrip path based on the similarity value between the embedding for the unlabeled training item for the roundtrip path and the embedding for the ending labeled training item for the roundtrip path; and
determining the roundtrip path probability from the product of the forward path probability and the backward path probability; and
performing an iteration of a neural network training procedure to determine a first value update to the current values of the network parameters that decreases roundtrip path probabilities for incorrect roundtrip paths, wherein an incorrect roundtrip path is a roundtrip path for which the starting labeled training item and the ending labeled training item have different labels.

13. The system of claim 12, the operations further comprising:
providing data specifying the trained neural network for use in generating embeddings of new input data items.

14. The system of claim 12, wherein performing the iteration of the neural network training procedure comprises:
performing the iteration to determine a second value update to the current values of the network parameters that increases uniformity across visit probabilities for embeddings of unlabeled training inputs, wherein a visit probability for an embedding given unlabeled training input is a sum of forward path probabilities for forward paths that go to the embedding for the unlabeled training input.

15. The system of claim 14, wherein performing the iteration to determine the second value update comprises:

performing the iteration to minimize a cross-entropy loss between (i) a uniform target distribution across the unlabeled training inputs and (ii) the visit probabilities for the unlabeled training inputs.

16. The system of claim 12, wherein performing the iteration to determine the first value update comprises:
performing the iteration to minimize a cross-entropy loss between (i) a target distribution over pairs of labeled training inputs that each include a respective first labeled training input and a respective second labeled training input and (ii) for each pair of labeled training inputs, a sum of roundtrip probabilities for roundtrip paths that start at the first labeled training input of the pair and return to the second labeled training input of the pair, wherein the target distribution assigns higher probabilities to pairs of training inputs that have the same label than to pairs of training inputs that have different labels.

17. The system of claim 16, wherein the target distribution assigns a zero probability to pairs of labeled training inputs that include a first labeled training input and a second labeled training input that have different labels.

18. The system of claim 16, wherein the target distribution assigns, to pairs of labeled training inputs that include a first labeled training input and a second labeled training input that have the same label, a probability that is equal to one divided by a total number of labeled training inputs that have the label.

19. The system of claim 12, wherein performing the iteration further comprises:
performing the iteration of the neural network training procedure to minimize a cross-entropy loss between, for each labeled training item, the label for the training item and the classification for the training item.

20. One or more non-transitory computer-readable storage media storing instructions that when executed by one or more computers cause the one or more computers to perform operations for training a neural network that has a plurality of network parameters and that is configured to receive an input data item comprising an image and to process the input data item to generate an embedding of the input data item in accordance with the network parameters, wherein the neural network is further configured to process the embedding of the data item to generate a classification output for the data item that includes a respective score for each of a plurality of categories, the operations comprising:
obtaining a labeled batch of labeled training items, wherein each labeled training item in the labeled batch is associated with a respective label that identifies a category to which the labeled training item belongs;
processing the labeled training items in the labeled batch using the neural network and in accordance with current values of the network parameters to generate respective embeddings for each of the labeled training items;
obtaining an unlabeled batch of unlabeled training items;
processing the unlabeled training items in the unlabeled batch using the neural network and in accordance with the current values of the network parameters to generate respective embeddings for each of the unlabeled training items;
determining a plurality of similarity values, each similarity value measuring a similarity between the embedding for a respective labeled training item and the embedding for a respective unlabeled training item;
determining, from the similarity values, a respective roundtrip path probability for each of a plurality of roundtrip paths, wherein each roundtrip path starts from the embedding for a respective starting labeled training item, goes to the embedding for a respective unlabeled training item, and returns to the embedding for a respective ending labeled training item, wherein determining the respective roundtrip path probability for each of the plurality of roundtrip paths comprises:
determining a forward path probability for a forward path from the embedding for the starting labeled training item for the roundtrip path to the embedding for the unlabeled training item for the roundtrip path based on the similarity value between the embedding for the starting labeled training item for the roundtrip path to the embedding for the unlabeled training item for the roundtrip path;
determining a backward path probability for a backward path from the embedding for the unlabeled training item for the roundtrip path to the embedding for the ending labeled training item for the roundtrip path based on the similarity value between the embedding for the unlabeled training item for the roundtrip path and the embedding for the ending labeled training item for the roundtrip path; and
determining the roundtrip path probability from the product of the forward path probability and the backward path probability; and
performing an iteration of a neural network training procedure to determine a first value update to the current values of the network parameters that decreases roundtrip path probabilities for incorrect roundtrip paths, wherein an incorrect roundtrip path is a roundtrip path for which the starting labeled training item and the ending labeled training item have different labels.

* * * * *